Feb. 21, 1933.   P. J. FITZGERALD   1,898,945
ELECTRICAL UTILITY DEVICE AND MOTOR ASSEMBLY
Filed June 12, 1931   3 Sheets-Sheet 2
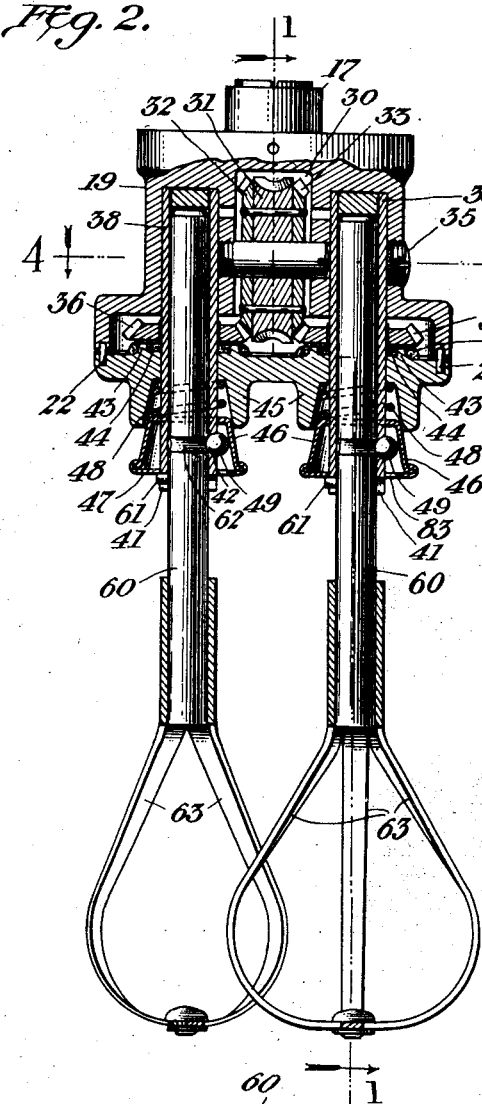
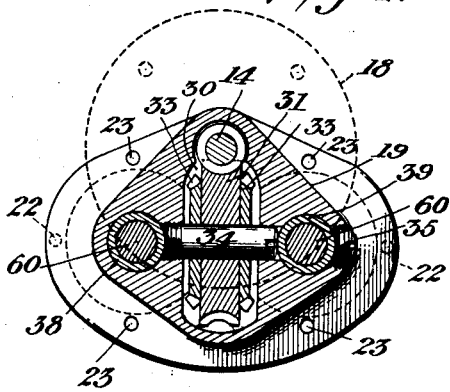
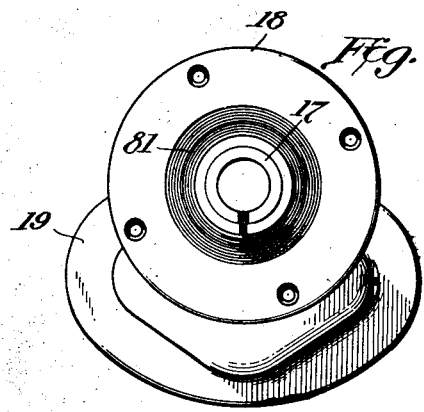
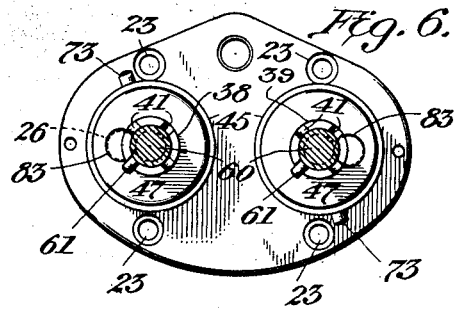
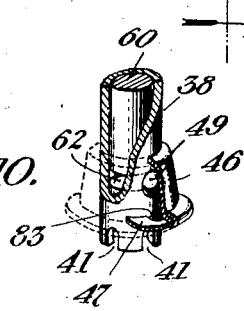
Inventor,
Patrick J. Fitzgerald.
By
Attorneys.

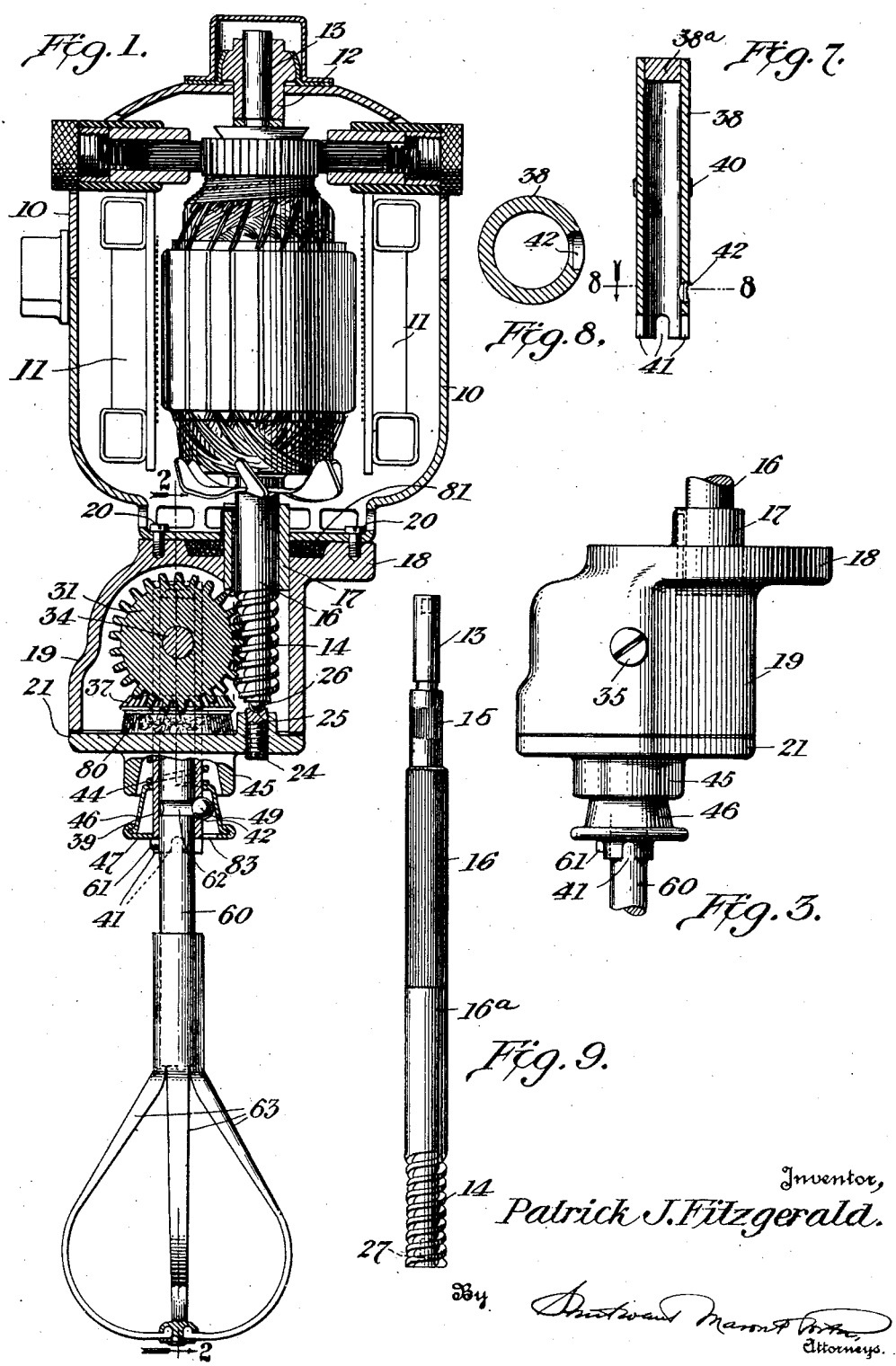

Feb. 21, 1933. P. J. FITZGERALD 1,898,945
ELECTRICAL UTILITY DEVICE AND MOTOR ASSEMBLY
Filed June 12, 1931 3 Sheets-Sheet 3
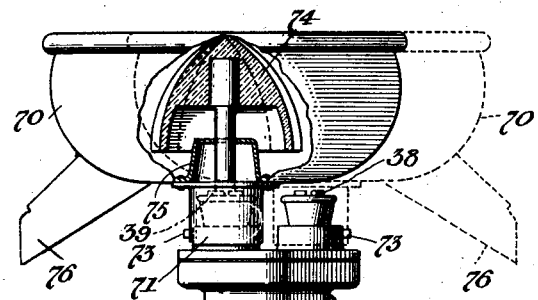
Fig. 11.
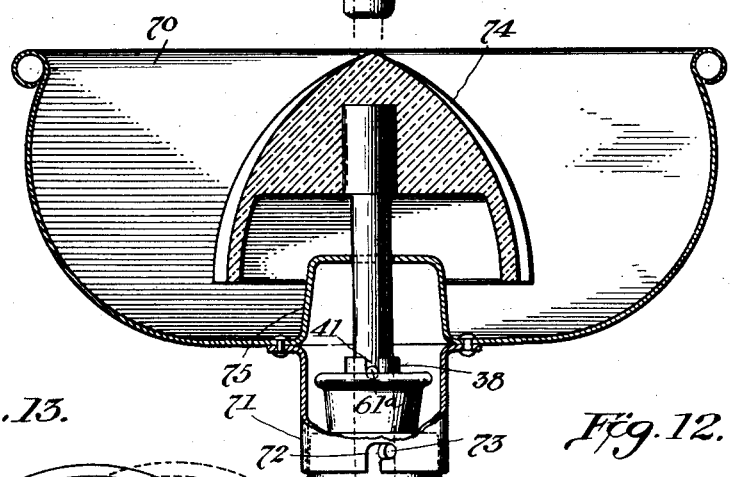
Fig. 13. Fig. 12.
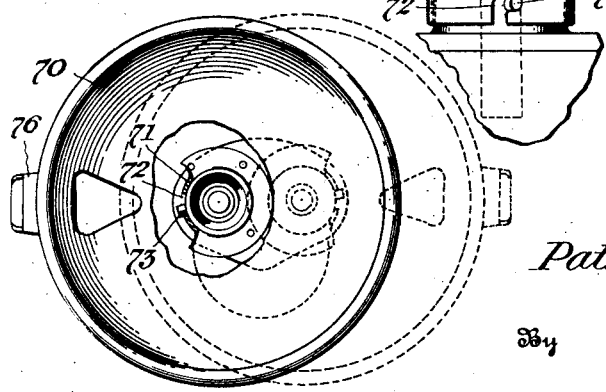
Inventor,
Patrick J. Fitzgerald.
By
Attorneys.

Patented Feb. 21, 1933

1,898,945

UNITED STATES PATENT OFFICE

PATRICK J. FITZGERALD, OF TORRINGTON, CONNECTICUT, ASSIGNOR TO THE FITZGERALD MANUFACTURING COMPANY, OF TORRINGTON, CONNECTICUT, A CORPORATION OF CONNECTICUT

ELECTRIC UTILITY DEVICE AND MOTOR ASSEMBLY

Application filed June 12, 1931. Serial No. 543,921.

This invention relates to electric utility devices, and more particularly concerns the assembly of the motor with reduction gearing and the tool or bowl employed with such a device.

One of the features of the present invention is a motor and reduction gearing assembly which may be cheaply constructed within close tolerances and which affords an excellent mechanical connection of the several parts.

Another feature of the present invention is a lamp device associated with the driven member or members of the reduction gearing for connecting a tool in position for operation through the gearing.

A further feature of the device is the production of a reduction gearing contained within a closed housing so that lubricant cannot escape therefrom, and with the provision on the gearing parts of means for connecting either a tool or a bowl to the gearing and its casing.

These and other objects of the present invention are set forth in the accompanying drawings, in which is illustrated one form of construction thereof, and in which:

Fig. 1 is a vertical diametrical section through the motor gearing assembly, on line 1—1 of Fig. 2.

Fig. 2 is a vertical sectional view substantially on line 2—2 of Fig. 1, showing the gearing and a pair of tools connected thereto.

Fig. 3 is a side elevational view of the gearing casing.

Fig. 4 is a horizontal sectional view through the gear casing substantially on line 4—4 of Fig. 2.

Fig. 5 is a plan view of the gear casing as shown in Fig. 2.

Fig. 6 is a bottom view of the same.

Fig. 7 is a vertical sectional view through one of the tool sleeves.

Fig. 8 is a sectional view on a somewhat larger scale, substantially on line 8—8 of Fig. 7.

Fig. 9 is an elevational view of the motor shaft.

Fig. 10 is a perspective view showing the relationship of the tool stem and the tool sleeve and clutch.

Fig. 11 is a view, on a smaller scale, showing the motor and gearing assembly in reverse position, with a fruit juice extractor mounted thereon.

Fig. 12 is an axial section, on the same scale as Figs. 1 and 2, through the extractor bowl, reamer and reamer stand.

Fig. 13 is a plan view, with portions broken away, on the same scale as Fig. 11.

In the drawings, a motor casing comprised of two sections 10 supports the field and field winding 11 for the motor and is provided on the upper section with a journal bushing 12 for the motor shaft end 13. The motor shaft is formed as a single structure extending from the upper bearing portion 13 to a threaded lower end 14 (Fig. 9) and is provided with knurled portions 15 and 16 upon which the armature core and the commutator are secured by force-fitting in well-known manner. A cylindrical portion 16a of the motor shaft is of the same or greater diameter than the threaded portion 14 and is mounted in a bearing bushing 17 (Fig. 1). Owing to the relative diameters of the portions 14 and 16, the housing 19 may be assembled to the lower motor casing 10, and then the motor shaft may be introduced through the bushing 17.

A flange 18 of a gear housing 19 is fixedly secured as by screws 20 to the flat end wall of the lower section 10 of the motor housing. This housing 19 receives the speed reduction elements of the reduction gearing and is closed by a closing plate 21, pins 22 preferably being provided in the two elements for aligning them accurately with regard to one another in position so that they may be tightly secured to form an oil and grease-tight joint, by screws received in the holes 23 (Fig. 6) passing into the casing 19. The closing plate 21 receives a screw 24 having a hardened end with a cup 25 therein for the accommodation of a steel ball 26 which is likewise received in a counter-sunk hole 27 (shown in dotted lines at the bottom of Fig. 9), so that it may operate as a thrust bearing to support the motor shaft and the parts thereon.

The casing 19 has a central cavity 30 to receive an assembly of a worm gear 31 and the two bevel gears 32, 33, which are pinned or otherwise rigidly secured together for rotational movement about the pivot shaft 34. This shaft 34 may be introduced through a hole in the side of the casing 19, which may be closed by a plug 35 (Figs. 2 and 3) to prevent leakage of grease from the casing. The shaft 34 is preferably threaded for engagement in the structure of the casing 19, as shown in Fig. 2. The worm gear 31 is in mesh with the thread 14 on the motor shaft and is driven thereby. The bevel gears 32 and 33 are respectively in mesh with the bevel gears 36, 37, which are secured to the tool sleeves 38, 39, which are free for rotation within holes in the casing 19. As shown in Fig. 7, the upper end of each sleeve is preferably closed as by a plug 38a to prevent the passage of oil or grease downwardly through the interior of the sleeve whereby it might enter a food stuff being prepared by a beating tool secured in the sleeve in the manner to be described hereinafter. These sleeves 38, 39 are also preferably formed with knurled portions 40 which are forced into the central holes of the gears 36, 37 so that these gears are rigidly assembled with the sleeves. The lower ends of the sleeves 38, 39 are provided with notches 41 (Figs. 1, 2, 6, 7 and 10), and with a hole 42 having a greater diameter at the external wall of the sleeve than at the internal wall (Fig. 8).

The gears 36, 37 are preferably supported on bearing members 43 which in turn rest on annular flanges of the closing plate 21 so that a cup is provided in which may be placed a suitable lubricating substance 44.

The sleeves 38, 39, extend through the closing plate 21 and the latter is provided with circular flanges 45, spaced from the sleeves and illustrated as having conical internal surfaces. A clamp is provided for each sleeve comprising the conical member 46, having an out-turned rim about which is curled the periphery of the closing disk 47 which has an aperture therethrough, closely fitting the sleeve 38 or 39 so that the assembly of the clamp is guided for sliding movement on the sleeve 38 or 39. A clamp spring 48 is located in each annular recess within the flange 45 and reacts between the closing plate 21 and the bottom of the cup portion 46 to force the latter in a downward direction in Figs. 1 and 2. A clamping ball 49 is located between the inner conical wall of the cup 46 and the wall of the aperture 42 in sleeve 38 or 39.

In the illustrated form shown in Figs. 1 and 2 a beating tool is provided for each sleeve comprising the stem 60, having a pin 61 thereon for engagement in one of the notches 41 of the sleeve 38 or 39 of a peripheral groove 62. At the bottom of each stem 60 are provided the beating blades 63.

The utility devices may be employed in the position shown in Figs. 1 and 2 for beating operation with the tools in position thereon. As the motor revolves, the threaded portion 14 of the shaft rotates the worm gear 31 about its pivot 34 and therewith the gears 32, 33 cause rotational movement of the gears 36, 37 and of the tool sleeves 38, 39 in opposite angular directions of rotation. The engagement of pins 61 in notches 41 causes the tool stems and the beater blades to be carried in rotation therewith and thus cause a stirring or beating by these blades in the usual manner.

It is also possible to invert the device, so that the gear casing 19 is above the motor and the flanges 49 are uppermost. A bowl 70 having a bottom flange 71 may now be placed upon the device so that the angular slot 72 (Fig. 11) will engage the pin 73 on one of the flanges 45, whereby the bowl 70 is held in a definite position upon the flange. The stem of a reaming tool 74 may now be passed through the flange 71 of the bowl 70 and engaged in the sleeve 38 or 39, and driven therefrom by the engagement of its pin 61a in a notch 41 as before. Preferably, the bowl is provided as usual with an upturned diverting wall 75 to prevent the flow of juice toward the motor and gearing. Owing to the exact angular position afforded by the interengagement of pin 73 and slot 72, the spout 76 of the bowl is directed toward the right in Fig. 11, for example, when the bowl is seated upon the flange 45 surrounding the sleeve 38. On the other hand, if the bowl be seated on the flange 45 surrounding the sleeve 49, the spout 76 is accurately directed toward the left. In either event, the bowl is held against rotational movement about the tool axis.

It will thus be seen that the present invention provides a very simple reduction gearing which can be fully enclosed. To assist in the closure of the parts, it is preferred to provide felt members 80, around the sleeves which provide passage for rotating elements while seepage of oil is limited and prevented.

In assembling the housing flange 18 with the lower section 10 of the motor casing, it is preferred to provide a wick- or twine-filled pocket 81 as an oil reservoir for the motor bearing, and an end of the twine, etc., is carried over the upper end of the bushing 17 and along an internal groove of this bushing to serve as a wick for the capillary conduction of oil to the motor bearing.

For ease in assembly, an aperture 82 is provided in the cover 47 for the clamp so that the ball 49 may be inserted and removed, this ball normally being retained in position against inward movement through the wall of sleeve 38 or 39 by reason of the restricted inner diameter of the hole 42, and prevented against downward movement in the position of Figs. 1 and 2 by the presence of the wall of the cup 46.

By this construction, the lower section 10 of the motor casing is connected to the flange 18 and housing 19 in the initial assembly. The gears 31, 32, 33 may then be inserted in the housing 19. The hollow shafts 38, 39, with their gears are inserted in the closing plate 21, the springs 48 are placed around the shafts and the cup clamps 46, 47 are forced downward and the balls 49 introduced through the apertures 83 into the holes 42. The housing 19 may now be packed with grease or oil and the closing plate placed in position, with the employment of a thin gasket. When the housing 19 and the closing plate 21 are tightened together, the gear casing is entirely enclosed with the lower bearing screw 24 in position. The motor shaft with its worm, armature and commutator, is then slid through the bushing 19 and by rotation is brought to proper engagement with the worm wheel 31. The upper section of the motor casing may now be placed in position and the thrust bearing screw 24 properly adjusted. When it is desired to oil the elements in the gear casing, the motor may be brought into the position of Fig. 11 and the screw 24 withdrawn for the addition of oil.

With this construction of parts, a rigid assembly is produced which can be supported in the usual manner. The hollow shafts 38, 39 permit the location of the beater blades 63 close to the gears 36, 37, which serve as driving devices for these beaters, and likewise the reamer may be closely connected when the parts are in the position of Fig. 11.

It is obvious that the invention is not limited solely to the form of execution shown, but that it may be modified in many ways in accordance within the scope of the appended claims.

The matter shown and described but not claimed forms the subject matter of divisional application filed by me May 19, 1932, Serial No. 612,357.

What is claimed is:—

1. An electrical utility device including the combination of a fixed structure and a tool sleeve having a hole in the wall thereof, said hole being of lesser diameter at the inner surface of said sleeve than at the outer surface, a ball located in said hole and of lesser diameter than the outer portion of said hole and of greater diameter than the inner portion of said hole so that said ball may extend into the inner space of said sleeve but is held against passage from the hole into the sleeve, a tool stem having an annular recess adapted to receive the inwardly projecting portion of the ball when said stem is located in said sleeve, means surrounding said stem for urging the ball inwardly, and a spring surrounding said stem and located between said structure and urging means.

2. An electrical utility device including the combination of a fixed structure and a tool sleeve having a hole of lesser diameter at the inner surface of the sleeve than at the outer surface, a stem having a recess adapted to be presented opposite said hole when said stem is located in said sleeve, a ball in said hole adapted to project beyond both walls of the sleeve and being of greater diameter than the lesser diameter of said hole, a cup having a conical wall surrounding said sleeve, said wall being engaged with said ball outside of said sleeve, and spring means located between said structure and cup for moving the cup axially of the sleeve whereby to force the ball inwardly in said hole.

3. An electrical utility device including in combination a sleeve having a hole of lesser diameter at the inner surface of the sleeve than at the outer surface, a cup having a conical wall surrounding said sleeve, a plate fixed to said cup and guided on the exterior of said sleeve, said wall having an aperture therethrough outside of the wall of said sleeve, a ball normally located in said hole and projecting into the sleeve and externally beyond the outer wall of the sleeve, said ball being of lesser diameter than said aperture, a spring for normally holding the cup and plate in position so that the conical wall retains the ball in said aperture, said cup and plate being movable along the sleeve to a position in which said ball may be disengaged from the hole and withdrawn through said aperture.

In testimony whereof, I affix my signature.

PATRICK J. FITZGERALD.